United States Patent [19]
Chiu

[11] Patent Number: 6,123,196
[45] Date of Patent: Sep. 26, 2000

[54] INSULATING JUGS STACKABLE ONE OVER THE OTHER

[75] Inventor: Brian Chiu, Kaohsiung, Taiwan

[73] Assignee: Fuu Hwa Vacuum Bottle Co., Ltd., Taiwan

[21] Appl. No.: 09/420,488

[22] Filed: Oct. 19, 1999

[51] Int. Cl.⁷ .................................................. B65D 21/36
[52] U.S. Cl. .......................................... 206/508; 222/570
[58] Field of Search ............................ 206/508; 222/566, 222/570

[56] References Cited

U.S. PATENT DOCUMENTS

| | | | |
|---|---|---|---|
| 5,035,324 | 7/1991 | Bertrand | 206/508 |
| 5,259,509 | 11/1993 | Boal, Jr. et al. | 206/508 |
| 5,669,526 | 9/1997 | Keyfauver | 206/508 |
| 5,735,427 | 4/1998 | Hunter et al. | 206/508 |
| 5,887,740 | 3/1999 | Hong | 206/508 |
| 5,896,993 | 4/1999 | Nask et al. | 206/508 |

*Primary Examiner*—Joseph M. Moy
*Attorney, Agent, or Firm*—Banner & Witcoff, Ltd.

[57] ABSTRACT

A plurality of insulating jugs are stackable one over the other. Each of the insulating jugs includes a jug body and a lid. The jug body has a top, a bottom, a receiving chamber, and a pouring opening disposed adjacent to a top of the jug body over the receiving chamber. The lid is disposed on the top of the jug body and has a seat member engaging the jug body over the pouring opening, a displaceable closure member disposed below the seat member and movable to close and open the pouring opening, and an operating lever extending over the seat member and connected to the closure member to actuate the closure member. A hollow cap is disposed over the seat member. The cap has a slot for outward extension of the operating lever from the closure member, and an upwardly projecting central boss. The central boss has a flat top face that is substantially flush with a part of the operating lever when the operating lever closes the pouring opening. The bottom of each of the insulating jugs is capable of resting on the cap of another one of the insulating jugs, and has a projection to surround the central boss of the cap, and a central positioning space surrounded by the projection to receive the central boss. The central boss has a height that is smaller than a depth of the positioning space.

5 Claims, 6 Drawing Sheets

INSULATING JUGS STACKABLE ONE OVER THE OTHER

BACKGROUND OF THE INVENTION

1. Field of the Invention

This invention relates to insulating jugs, more particularly to insulating jugs that are stackable one over the other.

2. Description of the Related Art

Referring to FIG. 1, a conventional insulating jug is shown to comprise a jug body 11 and a lid 12 disposed on a top portion of the jug body 11. The jug body 11 has a circular bottom 111, an annular projection 110 formed on a lower face of the bottom 111, and an annular wall 112 extending upwardly from the bottom 111 to define a liquid-receiving space 113 therein. A pouring opening 114 is formed above liquid-receiving space 113. The jug body 11 has an internal thread 115 formed adjacent to the pouring opening 114. A handle 13 is formed exteriorly of the jug body 11. The lid 12 has a seat member 121 disposed over the pouring opening 114 and engaging threadedly the internal thread 115, and a closure member 122 mounted thereon to close sealingly the pouring opening 114. The closure member 122 has a stem 123 extending upwardly through the seat member 121. A hollow cap 124 is disposed over the seat member 121. The cap 124 has a convex portion 125 projecting upwardly from a central portion thereof. To control the flow of liquid out of the liquid-receiving space 113, an operating lever 126 is provided below the cap 124 and is turnable about two fulcrums 127. The operating lever 126 has an engaging end 128 that is connected to an upper end of the stem 123, and a press end 129 that extends out of the cap 124.

To save storage space of a plurality of the insulating jugs 1, it is preferable to stack the insulating jugs 1 one over the other, as best illustrated in FIG. 2. However, the lower face of the bottom 111 of each of the jug bodies 11 is substantially flat and can not be disposed on the convex portion 125 of the other one of the jug bodies 11 in a stable condition. Usually, a holding rack is required to hold the stacked insulating jugs 1 in a stable condition.

SUMMARY OF THE INVENTION

The object of the present invention is to provide insulating jugs that can be stacked one over the other in a stable condition without using any holding racks.

According to the present invention, the insulating jugs are stackable one over the other in a stable condition, and each of the insulating jugs comprises a jug body and a lid. The jug body has a top, a bottom, a wall extending upwardly from the bottom, a receiving chamber defined by the bottom and the wall, and a pouring opening disposed adjacent to the top of the jug body over the receiving chamber. The lid is disposed on the top of the jug body and has a seat member engaging the jug body over the pouring opening, a displaceable closure member disposed below the seat member and movable to close and open the pouring opening, and an operating lever extending over the seat member and connected to the closure member to actuate the closure member. The seat member has an upper side, and a hollow cap that is disposed over the upper side. The cap has a slot for outward extension of the operating lever from the closure member, and an upwardly projecting central boss. The central boss has a flat top face that is substantially flush with a part of the operating lever when the operating lever closes the pouring opening. The bottom of each of the insulating jugs is capable of resting on the cap of another one of the insulating jugs, and has a projection formed along a periphery thereof to surround the central boss of the cap, and a central positioning space surrounded by the projection to receive the central boss. The central boss has a height that is smaller than a depth of the positioning space.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
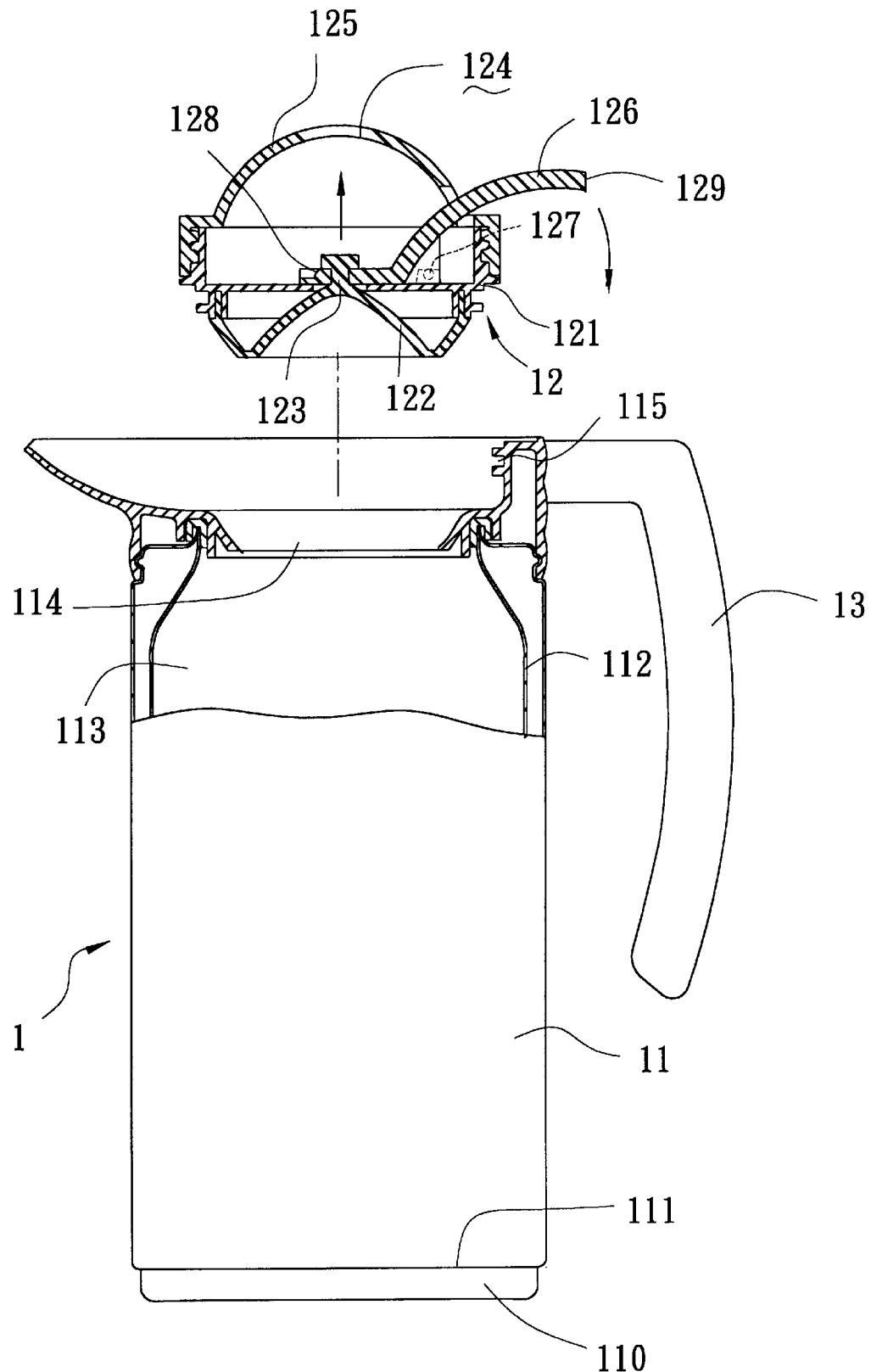
FIG. 1 is an exploded, cross sectional view of a conventional insulating jug.
Figure 2:
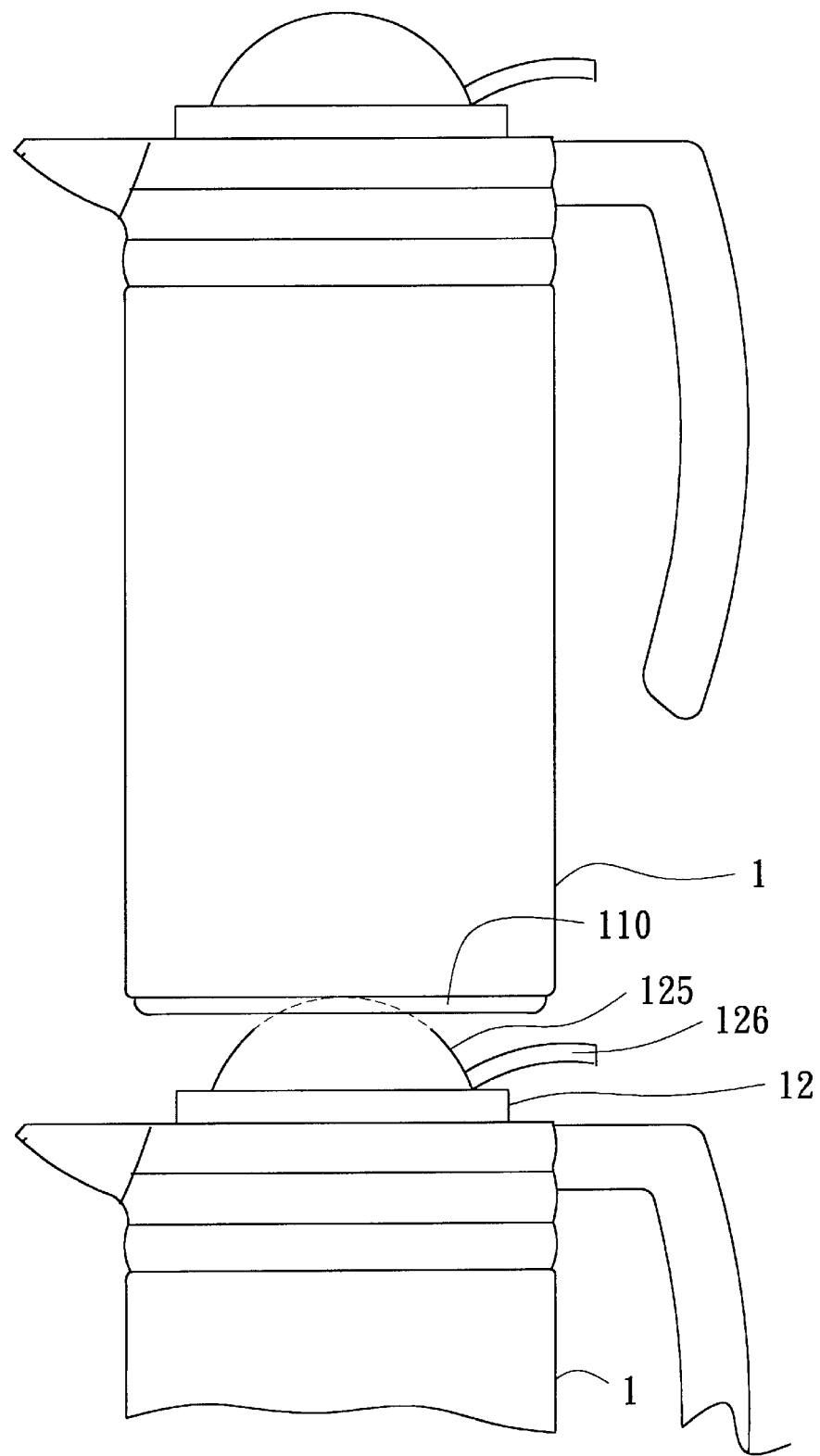
FIG. 2 is a schematic side view illustrating how a plurality of the insulating jugs of FIG. 1 are stacked one over the other.
Figure 3:
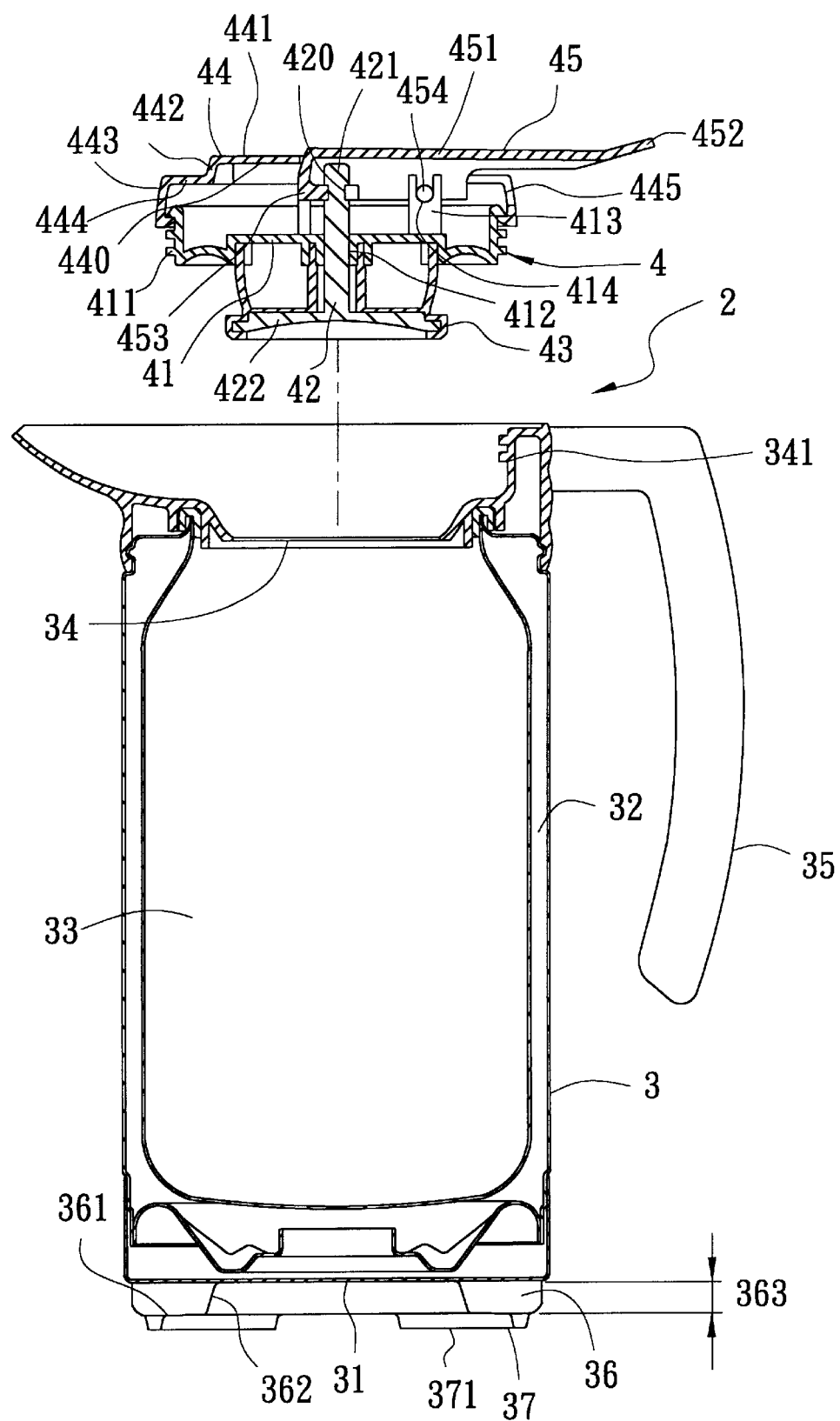
FIG. 3 is an exploded, cross sectional view of a preferred embodiment of an insulating jug according to the present invention.
Figure 4:
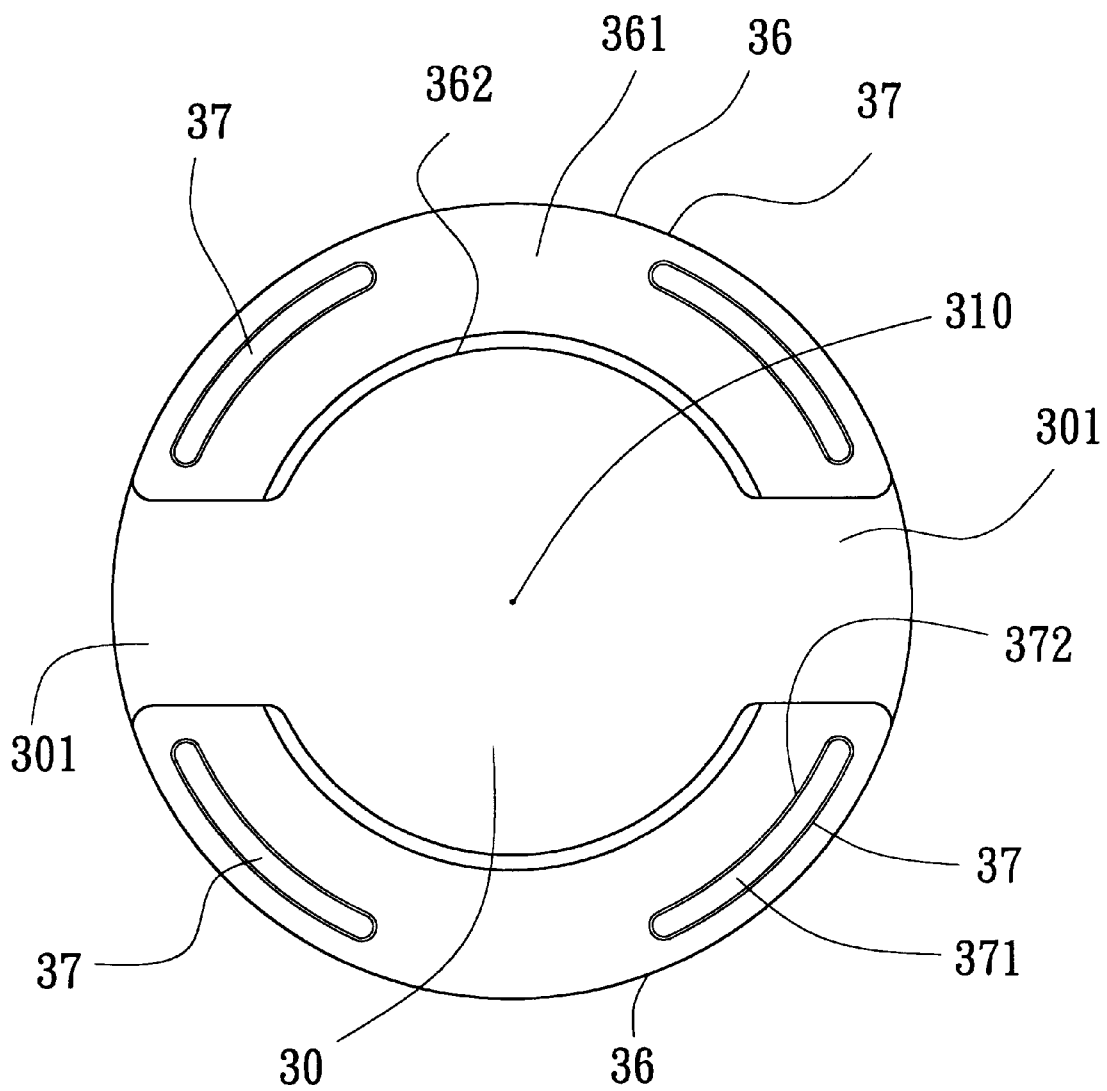
FIG. 4 is a bottom view of the preferred embodiment of the insulating jug according to the present invention.

Referring to FIGS. 3 and 4, a preferred embodiment of an insulating jug 2 according to the present invention is shown to comprise a jug body 3 and a lid 4.

The jug body 3 has a flat bottom 31, a wall 32 extending upwardly from the bottom 31, a receiving chamber 33 defined by the bottom 31 and the wall 32, and a pouring opening 34 disposed adjacent to a top of the jug body 3 over the receiving chamber 33. An internal thread 341 is formed adjacent to the top of the jug body 3. A handle 35 is provided on an external surface of the jug body 3. The bottom 31 has a pair of opposite first arcuate projection parts 36 formed on a lower face thereof and symmetrical about a center point 310 thereof. Each of the first arcuate projection parts 36 has diametrically opposed ends spaced apart from the opposed ends of another one of the first arcuate projection parts 36 to define two diametrically opposed notches 301 therebetween. The first arcuate projection parts 365 further have bottom faces 361 that are parallel to the lower face of the bottom 31 and that are spaced apart from the lower face of the bottom 31 by a depth 363, and first inner faces 362 extending divergently from the lower face of the bottom 31 to the bottom faces 361. A central positioning space 30 is surrounded by the first inner faces 362 of the first arcuate projection parts 36. Each of the first arcuate projection parts 36 has a pair of second arcuate projection parts 37 formed on a corresponding one of the bottom faces 361 thereof. The pairs of second arcuate projection parts 37 of the same height are symmetrical about the center point 310, and have bottom faces 371 and second inner faces 372 extending from the bottom faces 361 to the bottom faces 371.

The lid 4 is disposed on the top of the jug body 3, and has a seat member 41 provided with an external thread 411 that engages threadedly the internal thread 341 to couple the seat member 41 to the jug body 3. A through hole 412 is formed in a central portion of the seat member 41. Two opposed posts 413 project upwardly adjacent to the central portion of the seat member 41. Each of the posts 413 has a cavity 414 formed in an upper end thereof. A displaceable closure member 42 is disposed below the seat member 41, and has a stem 421 extending through the through hole 412 in the seat member 41, a disk member 422 connected to a lower end of the stem 421, and a flexible sealing member 43 disposed between the disk member 422 and the seat member 41. As such, the closure member 42 can be moved up and down to open and close the pouring opening 34 via the sealing member 43. The stem 421 has an annular notch 420 formed adjacent to an upper end thereof.

Figure 5:
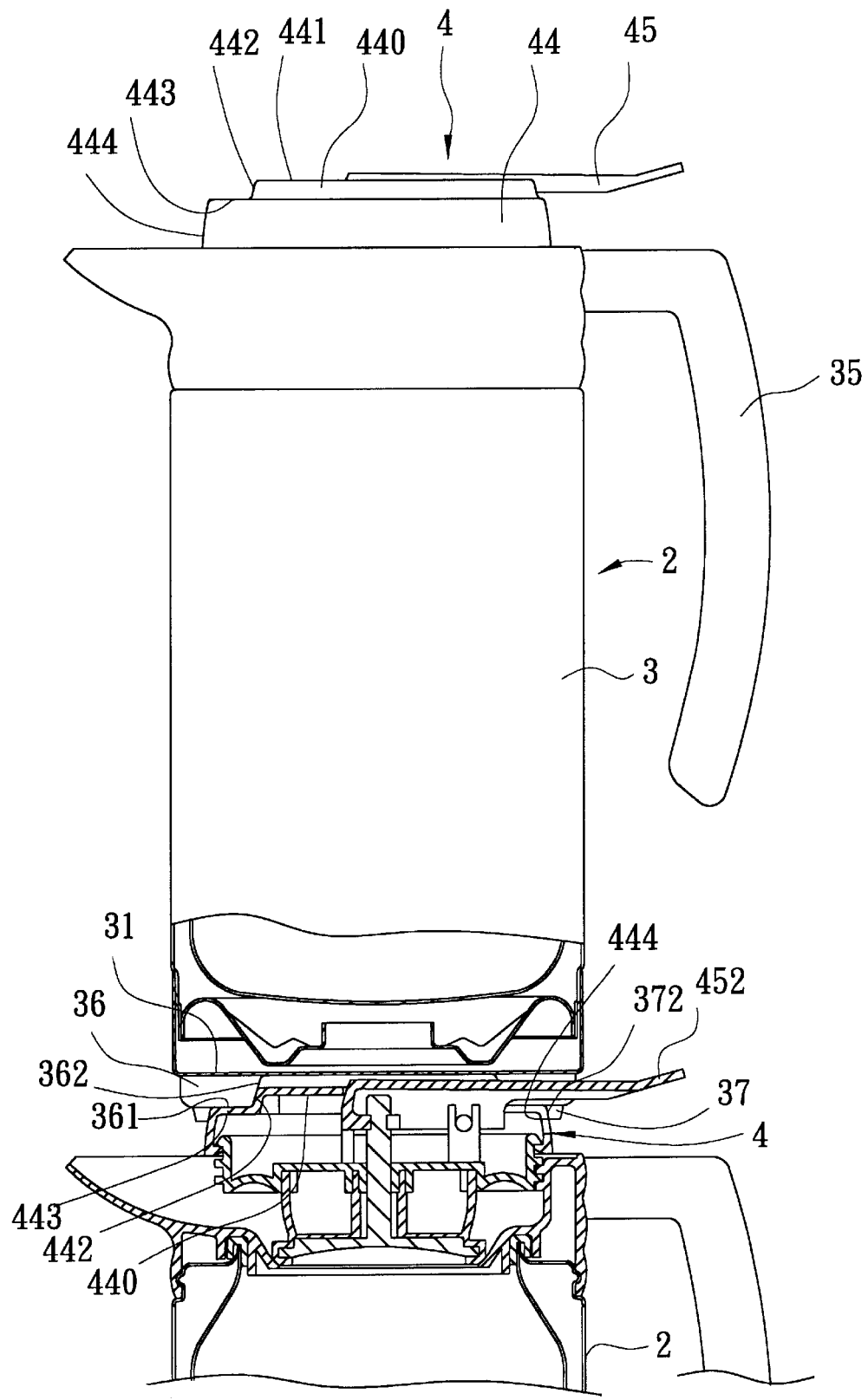
FIG. 5 is a schematic view illustrating how the insulating jugs of the preferred embodiment are stacked one over the other.

Referring to FIGS. 3 and 5, a hollow cap 44 is disposed over an upper side of the seat member 41. An operating lever 45 extends over the seat member 41 and is connected to the upper end of the stem 421. More specifically, the cap 44 engages the upper side of the seat member 41, and has an upwardly projecting central boss 440 and a slot 445 for outward extension of the operating lever 45. The central boss 440 has a flat top face 441. The top face 441 has a peripheral wall 442 extending obliquely and downwardly therefrom. A flat annular portion 443 extends horizontally and outwardly from a lower edge of the peripheral wall 442. The annular portion 443 has an abutment wall 444 extending downwardly from a distal edge thereof. The operating lever 45 has a horizontal portion 451 that is substantially flush with the top face 441, a press end 452 that extends out from the cap 44, and a downward hook end 453 that engages the annular notch 420 in the stem 421. A fulcrum shaft 454 projects downwardly between the press end 452 and the downward curved end 453 and rides on the cavities 414 in the posts 413. The height between the flat face 441 and the annular portion 443 is smaller than the depth 363 of the positioning space 30.

In use, the lid 4 is removed from the jug body 3 and a liquid is poured into the receiving chamber 33. The lid 4 is then threaded onto the jug body 3 to permit engagement of the sealing member 43 and the pouring opening 34 in order to seal the receiving chamber 33 in a thermal-insulating manner. When it is desired to pour the liquid out from the insulating jug 2, the press end 452 of the operating lever 45 is depressed to turn the operating lever 45 about the fulcrum shaft 454, thereby resulting in upward movement of the stem 421. As such, the sealing member 43 of the closure member 42 is moved upwardly and disengages from the pouring opening 34 to open the same. Therefore, the liquid can be poured out from the insulating jug 2 via the pouring opening 34.

Referring to FIGS. 4 and 5, when it is desired to stack a plurality of the insulating jugs 2 one over the other, the bottom 31 of one of the insulating jugs, i.e., the upper insulating jug 2, is disposed on the lid 4 of another one of the insulating jugs, i.e., the lower insulating jug 2. Meanwhile, the operating lever 45 is aligned with one of the diametrically opposed notches 301. When the upper insulating jug 2 is placed on the lower insulating jug 2, the central boss 440 of the lid 4 of the lower insulating jug 2 and the horizontal portion 451 of the operating lever 45 of the lower insulating jug 2 are received in the positioning space 30 of the upper insulating jug 2. The peripheral wall 442 of the cap 44 abuts correspondingly against the first inner faces 362. As such, the cap 44 of the lid 4 can be positioned in the positioning space 30. At this time, the press end 452 of the operating lever 45 extends out from one of the diametrically opposed notches 301. The annular portion 443 of the lower insulating jug 2 abuts against the bottom faces 361 of the first arcuate projection parts 36. The abutment wall 444 is supported and positioned by the second inner faces 372 of the second arcuate projection parts 37. In this way, the insulating jugs 2 can be stacked one over the other in a stable manner. The object of the present invention is thus met.

Figure 6:
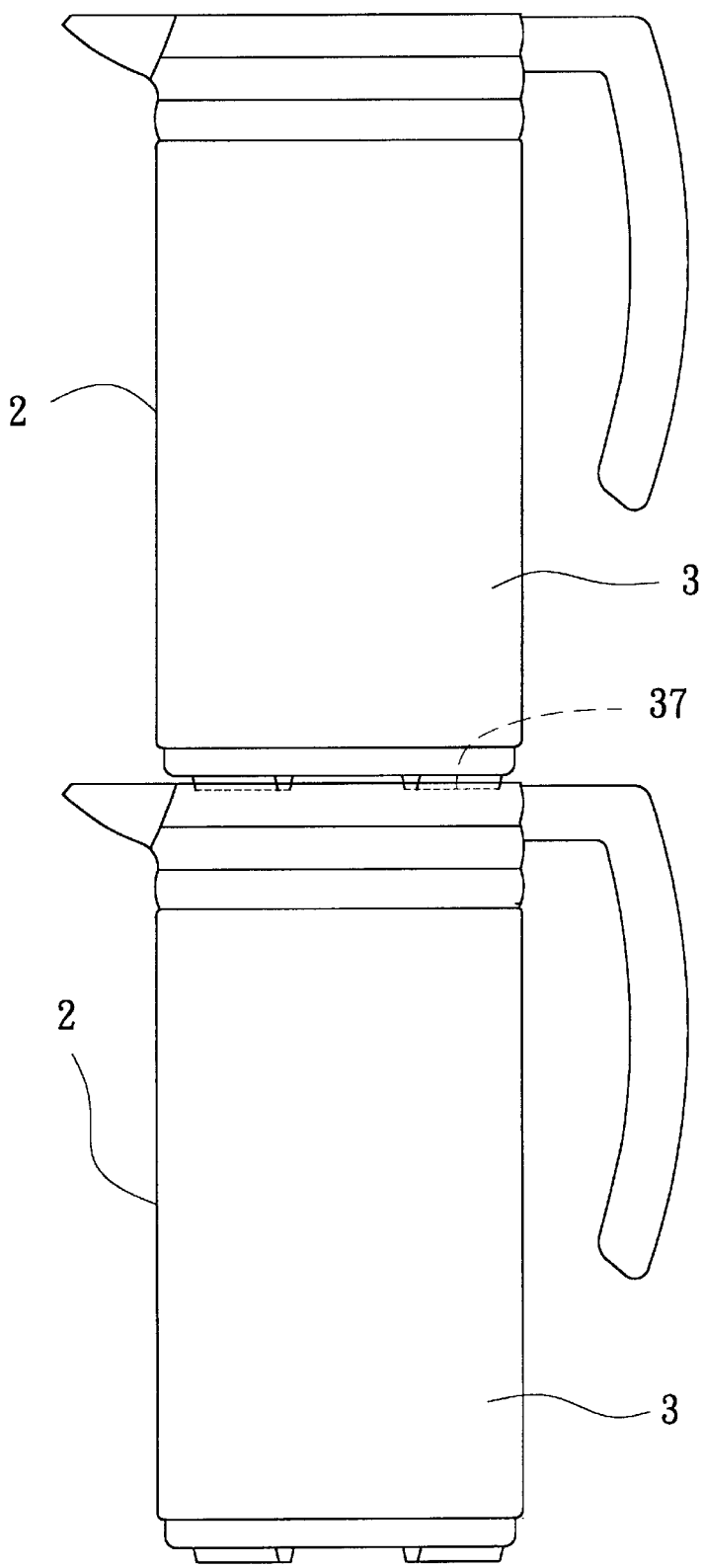
FIG. 6 is a schematic view illustrating the insulating jugs of the preferred embodiment in a stacked condition with the lids of the insulating jugs being removed.

Referring to FIGS. 3 and 6, the insulating jugs 2 are stacked one over the other with the lids 4 being removed from the jug bodies 3. In this case, the second arcuate projection parts 37 of the upper insulating jugs 2 are inserted into and are positioned in the pouring opening 34 of the lower insulating jug 2.

In practice, the jug body 3 of each of the insulating jugs 2 may consist of a bottom 31, a receiving chamber 33 and a pouring opening 34. In addition, a single first arcuate projection can be formed on the lower face of the bottom of each of the jug bodies to define a notch for outward extension of the operating lever instead of two arcuate projection parts 36.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. Insulating jugs stackable one over the other, each of said insulating jugs comprising:

a jug body having a top, a bottom, a wall extending upwardly from said bottom, a receiving chamber defined by said bottom and said wall, and a pouring opening disposed adjacent to said top of said jug body over said receiving chamber; and a lid disposed on said top of said jug body and having a seat member engaging said jug body over said pouring opening, a displaceable closure member disposed below said seat member and movable to close and open said pouring opening, and an operating lever extending over said seat member and connected to said closure member to actuate said closure member, said seat member having an upper side and a hollow cap disposed over said upper side, said cap having a slot for outward extension of said operating lever from said closure member, and an upwardly projecting central boss, said central boss having a flat top face that is substantially flush with a part of said operating lever when said operating lever closes said pouring opening, said bottom of each of said insulating jugs being capable of resting on said cap of another one of said insulating jugs and having a first projection formed along a periphery thereof to surround said central boss of said cap, and a central positioning space surrounded by said first projection to receive said central boss, said central boss having a height that is smaller than a depth of said positioning space.

2. The insulating jugs as claimed in claim 1, wherein said first projection on each of said insulating jugs has a pair of opposite first arcuate projection parts, each of which has diametrically opposed ends spaced apart from said opposed ends of another one of said first arcuate projection parts to define two diametrically opposed notches therebetween.

3. The insulating jugs as claimed in claim 2, wherein said central boss of each of said insulating jugs has a peripheral wall extending downwardly and obliquely from said top face, said first arcuate projection parts of each of said insulating jugs having first inner faces that abut against said peripheral wall of said central boss of said another one of said insulating jugs.

4. The insulating jugs as claimed in claim 3, wherein said cap of each of said insulating jugs further has a flat annular portion that extends horizontally and outwardly from a lower edge of said peripheral wall of said central boss, said first arcuate projection parts of each of said insulating jugs having bottom faces that abuts against said annular portion of said cap of another one of said insulating jugs.

5. The insulating jugs as claimed in claim 4, wherein said annular portion of said cap of each of said insulating jugs has an abutment wall extending downwardly therefrom, each of said first arcuate projection parts having a pair of second arcuate projection parts formed on a corresponding one of said bottom faces thereof, said second arcuate projection parts of each of said insulating jugs having second inner faces that abut against said abutment wall of said another one of said insulating jugs.

* * * * *